US008843651B2

(12) United States Patent
Sugumar et al.

(10) Patent No.: US 8,843,651 B2
(45) Date of Patent: Sep. 23, 2014

(54) SOFTWARE AWARE THROTTLE BASED FLOW CONTROL

(75) Inventors: Rabin A. Sugumar, Sunnyvale, CA (US); Bjørn Dag Johnsen, Oslo (NO); Lars Paul Huse, Oppegård (NO); William M. Ortega, Lawrenceville, GA (US)

(73) Assignee: Oracle America, Inc., Redwood City, CA (US)

( * ) Notice: Subject to any disclaimer, the term of this patent is extended or adjusted under 35 U.S.C. 154(b) by 1005 days.

(21) Appl. No.: 12/495,452

(22) Filed: Jun. 30, 2009

(65) Prior Publication Data
US 2010/0332676 A1     Dec. 30, 2010

(51) Int. Cl.
*G06F 15/16*    (2006.01)
*H04L 12/931*   (2013.01)
*H04L 12/835*   (2013.01)
*H04L 12/801*   (2013.01)
*H04L 12/825*   (2013.01)
*H04L 12/841*   (2013.01)
*H04L 12/861*   (2013.01)

(52) U.S. Cl.
CPC ............... *H04L 47/10* (2013.01); *H04L 49/00* (2013.01); *H04L 47/30* (2013.01); *H04L 47/26* (2013.01); *H04L 47/283* (2013.01); *H04L 49/90* (2013.01)
USPC ........................................................ 709/232

(58) Field of Classification Search
CPC ......... H04L 47/10; H04L 47/11; H04L 47/15; H04L 47/19
USPC ......................................... 709/232–237, 231
See application file for complete search history.

(56) References Cited

U.S. PATENT DOCUMENTS

| 5,448,698 | A | | 9/1995 | Wilkes |
| 6,044,419 | A | * | 3/2000 | Hayek et al. ............ 710/57 |
| 6,125,399 | A | | 9/2000 | Hamilton |
| 6,301,625 | B1 | * | 10/2001 | McDonald et al. ......... 710/5 |
| 6,389,468 | B1 | * | 5/2002 | Muller et al. ............ 709/226 |
| 6,704,831 | B1 | | 3/2004 | Avery |

(Continued)

OTHER PUBLICATIONS

Fabrizio Petrini, Wu-Chun Feng, Adolfy Hoisie, Salvador Coll, and Eitan Frachtenberg; "The Quadrics Network: High-Performance Clustering Technology"; Los Alamos National Laboratory; IEEE Micro 22(1) Jan.-Feb. 2002; pp. 46-57.

(Continued)

*Primary Examiner* — Chirag R Patel
(74) *Attorney, Agent, or Firm* — Meyertons Hood Kivlin Kowert & Goetzel, P.C.; Jeffrey C. Hood

(57) ABSTRACT

A system, comprising a compute node and coupled network adapter (NA), that supports improved data transfer request buffering and a more efficient method of determining the completion status of data transfer requests. Transfer requests received by the NA are stored in a first buffer then transmitted on a network interface. When significant network delays are detected and the first buffer is full, the NA sets a flag to stop software issuing transfer requests. Compliant software checks this flag before sending requests and does not issue further requests. A second NA buffer stores additional received transfer requests that were perhaps in-transit. When conditions improve the flag is cleared and the first buffer used again. Completion status is efficiently determined by grouping network transfer requests. The NA counts received requests and completed network requests for each group. Software determines if a group of requests is complete by reading a count value.

15 Claims, 8 Drawing Sheets

(56) References Cited

U.S. PATENT DOCUMENTS

| | | | |
|---|---|---|---|
| 6,836,785 B1* | 12/2004 | Bakshi et al. | 709/203 |
| 7,313,627 B1* | 12/2007 | Noble | 709/233 |
| 7,496,095 B1 | 2/2009 | Davis | |
| 7,631,132 B1* | 12/2009 | Neuman | 710/244 |
| 2002/0184414 A1* | 12/2002 | Jin et al. | 710/57 |
| 2003/0023666 A1 | 1/2003 | Conway et al. | |
| 2005/0243862 A1* | 11/2005 | Krishnan | 370/468 |
| 2008/0127203 A1 | 5/2008 | Huang et al. | |

OTHER PUBLICATIONS

International Search Report and Written Opinion for Application No. PCT/US2010/026911, mailed Aug. 20, 2010; 15 pages.

Office Action for U.S. Appl. No. 12/402,804, mailed Sep. 20, 2010; 16 pages.

"InfiniBand Architecture Specification vol. 1, Release 1.2.1"; InfiniBand Trade Assocation; Nov. 2007; 1727 pages.

Michael L. Scott; "Shared Memory Models"; Workshop on Communication and Middleware for Parallel Programming Models; Apr. 2002; 29 pages.

Leonidas Kontothanassis, Robert Stets, Galen Hunt, Umit Rencuzogullari, Gautam Altekar, Sandhya Dwarkadas, and Michael L. Scott; "Shared Memory Computing on Clusters with Symmetric Multiprocessors and System Area Networks"; ACM Transactions on Computer Systems, vol. 23, Issue 3, Aug. 2005; 33 pages.

Yong Xiong, Jyh-Charn Liu, and Wei Zhao; "On the Smoothing of Traffic Flows Using On-Off Control"; Real-Time Systems Symposium, Work-in-Progress Session, Dec. 3, 2003; 3 pages.

* cited by examiner

SOFTWARE AWARE THROTTLE BASED FLOW CONTROL

FIELD OF THE INVENTION

This disclosure relates to the broad area of networks that interconnect servers to enable interserver communication. More specifically, it relates to efficiency improvements in the initiation of network messages and an efficient completion tracking mechanism for CPU issued network requests.

DESCRIPTION OF THE RELATED ART

A cluster generally refers to a group of computers that have been linked or interconnected to operate closely together, such that in many respects they form a single computer. Large clusters can comprise thousands of individual computer systems that have been linked together. The components (e.g., individual computers or "compute nodes") of a cluster are often connected to each other through local area networks via network adapters. Clusters generally provide greatly improved performance and/or availability over that provided by a single computer. A cluster is also typically more cost-effective than a single computer of comparable speed or availability.

A cluster generally comprises a plurality of compute nodes (e.g., servers) and the "interconnect" between these compute nodes. An important aspect to building large cluster systems is the interconnect. The interconnect may comprise a "fabric", e.g., the network that connects all of the servers together, as well as host adaptors that interface each of the computer systems (servers) to the fabric. One commonly used cluster interconnect is Ethernet. More recently, clusters have started using InfiniBand (IB) as the interconnect. InfiniBand is a switched fabric communications link primarily used in high-performance computing and provides quality of service and failover features as well as scalability. An InfiniBand interconnect generally provides lower latency, higher bandwidth, and improved reliability.

Many organizations such as research centers and national laboratories require large clusters with thousands of nodes to satisfy their compute requirements. It is very important to reduce the overhead of communication in such large clusters to allow applications to scale efficiently.

Compute nodes in a cluster may use various mechanisms for communication with other compute nodes in the cluster. For example, compute nodes may use a protocol referred to as Message Passing Interface (MPI) for data communication. Compute nodes may also use Remote Direct Memory Access (RDMA). Further, compute nodes may use CPU loads and stores to perform data communication.

RDMA allows data to be moved directly from the memory of one computer to the memory of another computer without involving either computer's operating system. This permits high-throughput, low latency networking.

CPU load and store transfers involve the CPU directly performing the data transfer operation itself.

Latency and Overhead Associated with Network Requests

The overhead to initiate a message-send over a network may be a key performance limiter for many applications that run over a cluster of server nodes—in particular when message sizes are small. For a compute node with an InfiniBand interface, application software running on the host CPU deposits requests to send messages in a work queue in host memory. An IB network adapter (NA) then reads work requests from the work queue and sends messages over the network. Such a programming interface may be simple to design, but it can add latency and overhead both at the IB network adapter and the host. In this scheme the NA reads the work request from memory prior to processing, adding latency to request processing. Host software is responsible for managing the work queue, reaping completions, removing requests that have completed and tracking available space in the work queue.

More specialized NAs may include dedicated memory for software to deposit work requests. While this adapter memory may well reduce latency it is unlikely to reduce the host CPU's overhead. Furthermore, the adapter memory may be managed so that it is effectively partitioned amongst the software threads that use the NA. If there are a large number of threads, and there is an absence of specific knowledge of usage patterns, each software thread may get a small number of entries. This may limit the total number of requests that may be issued concurrently to the NA.

Completion Tracking of Issued Network Requests

When an application process or thread running on a CPU wishes to initiate a network request (for example, a request to send a message, or to receive a message, or to perform an RDMA operation, or to perform another network operation), the process generally writes a request in a hardware defined format to a hardware recognized address or location in the NA or in memory.

The NA then proceeds to service the request. When the NA has completed service of the request it notifies the requesting application that the request is complete. This notification may, for example, serve to inform the requesting application, that it can reclaim a message send buffer (perhaps located in system memory). Alternatively, the notification may serve to inform the requesting application that a message receive buffer (perhaps located in system memory) now has incoming data. This notification is commonly achieved first, by the network adapter writing a completion record (corresponding to the request) to a completion queue in system memory and then second, by the application obtaining the record from the completion queue.

Studies have shown that the software overhead of reaping a completion (i.e. obtaining a corresponding completion record) is, in many cases, greater than the software overhead involved in initiating a request. This is partly owing to the cost of associating a completion with the original request, which is not always straightforward since a completion queue may be shared among multiple connections, and completions may return out-of-order from the different connections. In addition, the completion queue is one more queue for software to manage. In highly optimized applications, where software overhead of less than 100 ns per message is desirable, the cost of completion processing can be significant.

SUMMARY OF THE INVENTION

Embodiments of the invention relate to transfer data across networks such as Infiniband (IB) networks. Embodiments of the invention may have improved network performance, improved compute performance, may have reduced system cost and may be better able to support future system configurations. Embodiments may have greater efficiencies, lower latencies, and improved robustness to network problems when processing data transfer requests across a network.

An embodiment of the invention may include a system in which a local compute node connects to a network adaptor (NA), and the NA is configured to receive remote data transfer requests issued by the local compute node, buffer information corresponding to those requests, and then issue corresponding data transfer requests on a network interface. One embodiment may operate as follows.

Remote data transfer requests may be issued by the local compute node and may be received and processed by the NA. These requests may take the form of CPU load requests or CPU store requests to local addresses. The NA may be configured to identify such requests and issue corresponding network requests. The NA may also be configured to place information relating to these in-coming transfer requests in an "in-line" buffer.

When the number of entries in the in-line buffer exceeds a certain threshold (e.g. the buffer is full or nearly full) and network problems (such as requests taking a long time to complete) are detected by the NA, then the NA may set a flag in a location (such as in system memory on the compute node) that can be read by devices (such as compute node CPUs) and software (such as processes) that issue remote transfer requests.

Software reads the flag location before issuing requests. When the flag is set (i.e. set to a value that indicates no more requests should be sent), no further requests are issued by compliant software processes. However, additional requests may already be en-route to the NA. The NA may have a second buffer (or another portion of the memory holding the in-line buffer) where information corresponding to requests that arrive after the flag is set can be stored. The second buffer is sized to accommodate such late-arriving transfer requests from all possible request sources (e.g. multiple processes, multiple CPUs).

Non compliant or misbehaving or rogue software may continue to send commands after the flag is set. This may cause the second buffer to fill up. When the number of entries in the second buffer tops a threshold (e.g. the second buffer is full), the NA sets a flag to indicate an error condition and then, if there is no more buffer space, the NA receives but discards future incoming requests.

After the flag is set, the NA may, at some point, be able to process network requests so that the second buffer is emptied of pending requests. Once the NA detects that the second buffer is empty, it may (if conditions are suitable) indicate that new transfer requests can, once again, be issued. The NA does this by clearing the flag it previously set. Transfer requests received after the flag is cleared now cause information to be placed, once again, in the first buffer of the NA.

An embodiment of the invention also may include a system in which a compute node connects to a NA and where the NA is configured to receive remote data transfer requests issued by the compute node. Since the processing of these remote data transfer requests is subject to variable delays (such as buffering delays, network delays and remote node delays) there can be a significant effort involved in checking the completion status of such transfer requests. The performance of the system is improved via a more efficient method for checking completion status which is now described in some detail.

Software running on the compute node contains instructions in which some remote data transfer requests belong to (or are associated with) completion groups. These completion groups are constructed so that the system may more efficiently determine the completion status of remote transfer requests.

The NA supports, through hardware, a number of completion groups. For each supported completion group, the NA provides an associated counter and flush register. Hereafter, the term "completion group" (CG) can be assumed to mean "supported completion group". When a remote transfer request corresponding to a CG is received by the NA, the associated CG counter is incremented. Also, when a network transfer request corresponding to a CG is completed, the associated CG counter is decremented. After all the issued requests belonging to a CG have been received by the NA, the value of the associated CG counter provides the status of the issued CG requests. If, under such conditions, a CG counter is found to equal zero, then all the issued CG requests can be understood to have been completed. If, under such conditions, a CG counter is found to equal two, then two of the issued CG requests can be understood to have not completed.

Many of today's CPUs are highly pipelined and consequently it can be difficult for software to determine when an issued load/store command has completed on an external bus. Since it may be misleading to check completion status by reading a CG counter before all the issued CG transfer requests have actually been received by the NA, additional support is provided on the NA by way of flush registers.

As previously mentioned, each CG (and, by implication, CG counter) has an associated flush register. Flush registers are set by flush requests commands and reset by flush reset commands. When a process wishes to check the completion status of a sequence of transfer requests belonging to a CG, the process issues a flush command after the sequence of transfer requests have been issued. Flush commands have the property of forcing previously issued commands (e.g. remote transfer requests) to complete ahead of them.

A process can check the completion status of a sequence of transfer requests belonging to a CG by first checking that an associated flush register is set. If the flush register is not set, the process can read the register again later after waiting or yielding control to the OS. Once flush register is found to be set, then the value of the associated CG counter provides, as described before, the completion status for the sequence of CG transfer requests.

BRIEF DESCRIPTION OF THE DRAWINGS

A better understanding of embodiments of the present invention can be obtained when the following detailed description of the preferred embodiment is considered in conjunction with the following drawings, in which.

Figure 1:
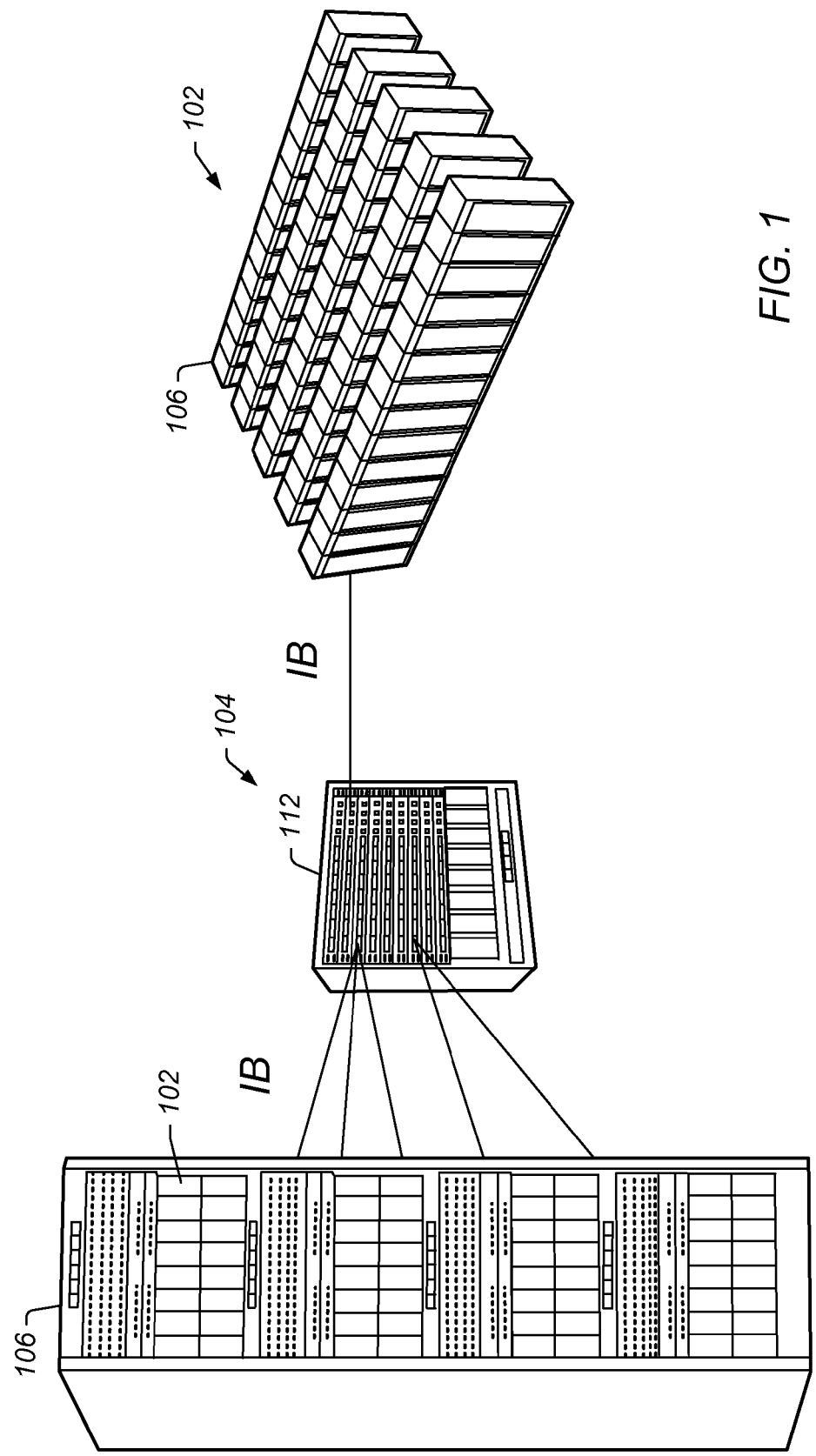
FIG. 1 illustrates an exemplary cluster according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Definitions

Compute Node—refers to a computer system having a processor (or CPU) and memory. A Compute Node may have a single processor (which may be single core or multi-core) or may have a plurality of processors. One example of a Compute Node is a blade server.

Network Fabric—refers to a network or interconnect for connecting multiple Compute Nodes.

Compute Node Interface Device—refers to an interface for coupling a Compute Node to a Network Fabric.

The above terms are used in the written description below, but are not capitalized.

Issuing Network Message Requests

As previously discussed in the description of related art, there are significant issues associated with the traditional ways in which a CPU can issue network requests. If the CPU writes requests to system memory, there may be a latency penalty associated with the network adaptor (NA) reading the requests. There may also be an overhead incurred in managing associated queues. If the CPU writes to dedicated memory on a network adapter, the latency penalty may be smaller, but there may be additional issues of cost, support for large numbers of threads and, as before, overhead incurred for managing queues.

A better approach may be to have the CPU issue work requests in the form of store sequences directly to the network adapter, and for the network adapter to process the stream of requests, thus avoiding the overhead and limitations of CPUs storing requests into queues and having the adapter read from queues. Such a streaming approach is similar to how memory is accessed by a host CPU where a sequence of loads and stores are issued directly to the memory subsystem.

The challenge however in such a design, where requests stream in to the network adapter, is how to manage the stream when there is congestion in the network preventing the adapter from processing the stream for long periods. Unlike memory subsystems that operate in rigidly controlled environments, general interconnection networks such as InfiniBand may be configured in a variety of ways and may scale to 1000s of entities through the addition of switches and routers, and are often robust enough to recover from component failures through rerouting. It may not be possible to guarantee deterministic delays in an InfiniBand network in the general case.

When there is network congestion, the request stream backs up, perhaps as far as the CPU. This can prevent the CPU from issuing further requests. Short periods of congestion (e.g. 50 uS) may be acceptable. The congestion may impact performance, but congestion is a consequence of network problems and it often cannot be avoided. However, long periods of congestion (e.g. 100 mS) while rare, may also occur. In this case, stores issued by the CPU may not complete, but rather wait in the CPU store buffer for the duration of the delay (e.g. many microseconds (ms)). Eventually, this may lead to hardware or software timeouts, perhaps causing the operating system to crash or enter a failed state. A complete solution will therefore have a mechanism to prevent such serious problems.

Embodiment Illustrations

FIG. 1 illustrates an exemplary cluster system according to one embodiment of the invention. As shown, the system may include a plurality of computer systems or compute nodes 102 that are connected together by an interconnect 104. The compute nodes 102 may take various forms. In the embodiment of FIG. 1, the compute nodes 102 include blade servers that are housed in one or more racks 106. The interconnect 104 may include a fabric switch 112 as shown. The interconnect 104 may support only a single protocol, or may support a plurality of protocols. In the exemplary embodiment shown, the interconnect 104 may support the IB protocol.

In FIG. 1, the exemplary cluster comprises one or more racks 106 each comprising 4 blade server chassis' which each comprise a plurality of blade servers (compute nodes) 102. The blade servers 102 connect to the fabric switch 112 through Infiniband. In one embodiment, the blade servers 102 connect to the fabric switch 112 over Infiniband. As shown in FIG. 1, the fabric switch 112 may couple to additional racks 106 having additional compute nodes 102.

Each of the compute nodes 102 may couple to (or include) a compute node interface device, also referred to herein as a "Network Adaptor" or Scalable Interface (SIF), (110 FIG. 2) which provides an interface for the respective compute nodes 102. The compute node interface device or SIF 110 couples to a respective compute node 102 and provides an IB interface for the compute node 102 to the fabric 104, e.g., to the fabric switch 112.

Figure 2:
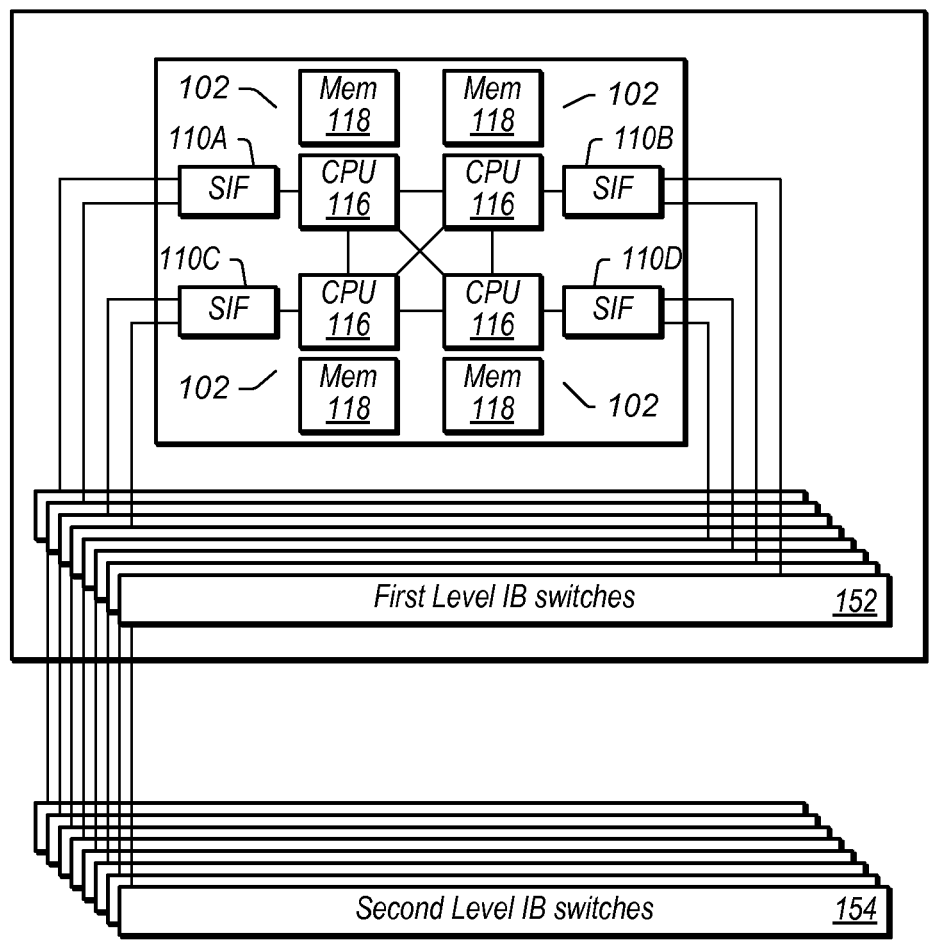
FIG. 2 is a block diagram of a portion of the cluster of FIG. 1, showing an exemplary compute node (4 server blade) connected to several levels of switches.

FIG. 2 is a block diagram illustrating a portion of a cluster system including an exemplary server blade (compute node 102) connected to form the cluster. Each compute node 102 includes a corresponding Scalable Interface (SIF) block 110 (labeled as 110A-110D). Each CPU 116 couples to its respective Scalable Interface (SIF) 110A-D also located on the blade server. The SIF blocks 110 (110A-110D) each provide an Infiniband interface to a respective compute node 102. The SIF blocks 110 (110A-110D) each comprise a host interface for coupling to the host bus or processor bus of its respective compute node 102, as well as an Infiniband interface. The SIF block 110 is discussed in more detail with respect to FIG. 3. The SIF 110 is also referred to herein as the "compute node interface device" (defined above) or the "network adaptor" or "NA".

Each of the SIF blocks 110 (110A-110D) may couple to Infiniband switches 152, referred to in FIG. 2 as First Level IB switches 152. The First Level IB switches 152 in turn may couple to Second Level IB switches 154, as shown. The First Level IB switches 152 may couple to the Second Level IB switches 154 through cables. There may be additional levels of IB switches.

Figure 3:
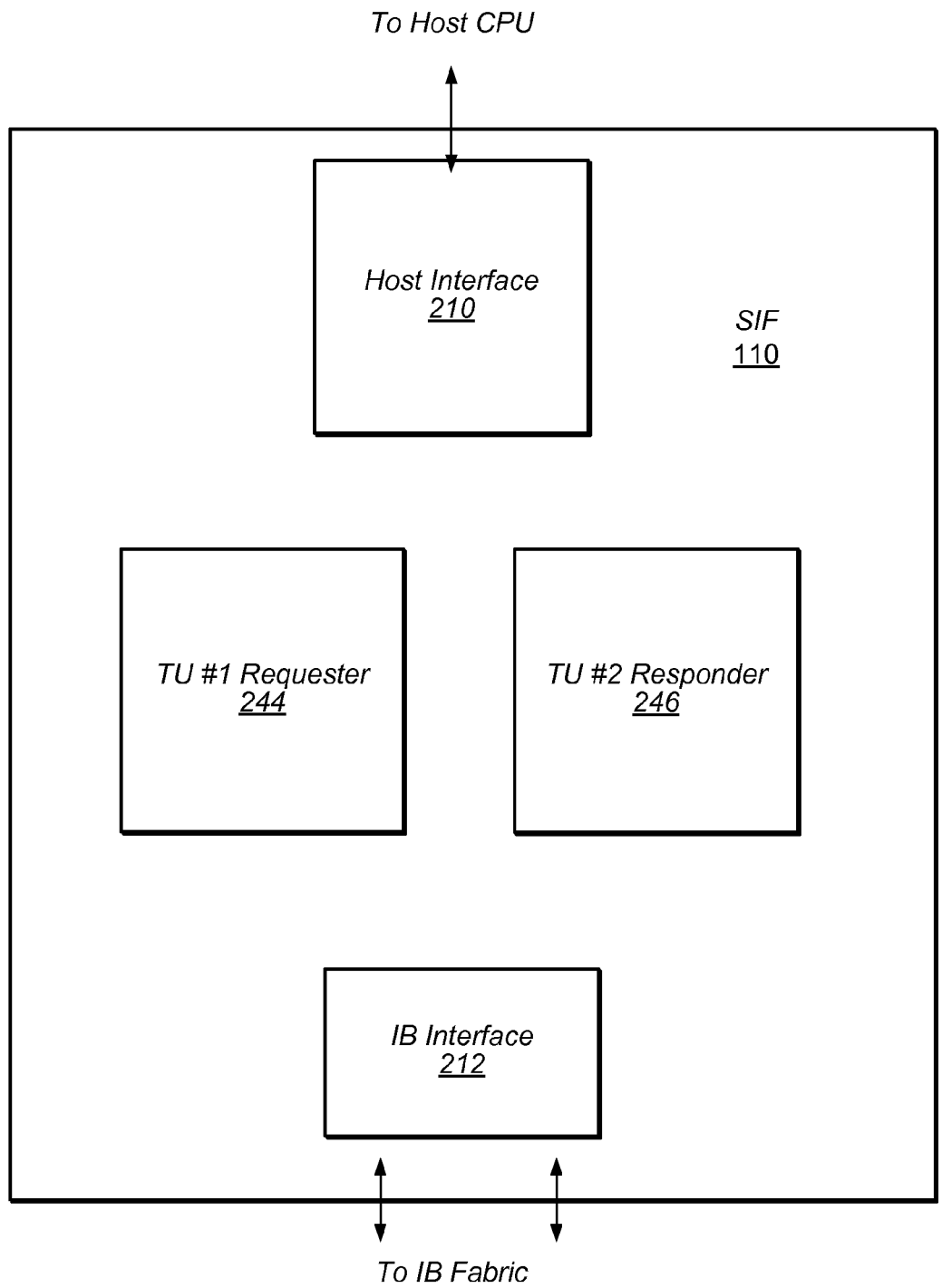
FIG. 3 is a block diagram of an exemplary scalable interface (SIF) used in interconnecting the various compute nodes in the cluster of FIG. 1.

FIG. 3 is a block diagram of an exemplary Scalable Interface (SIF) block 110. The SIF network adapter 110 operates as an interface or I/O adapter for each compute node 102 in the cluster. In one embodiment, the SIF 110 does not include a general purpose CPU and does not execute an operating system, and hence is a hardware-centric structure. The SIF 110 provides various services in hardware that would normally require software execution.

As shown, the SIF block 110 includes a host bus interface 210 for coupling to a computer system, e.g., in compute node 102. The SIF block 110 also includes a network fabric interface such as Infiniband interface 212, for coupling to Infiniband, e.g., for coupling to the network fabric 104.

The exemplary SIF block 110 may include a TU#1 (Transaction Unit) Requestor block 244 and TU#2 Responder block 246. The TU#1 Requestor block 244 may generate/process requests that are provided to other computer systems. The TU#2 Responder block 246 may be responsible for responding to incoming packets, e.g., incoming send requests from other compute nodes 102. The TU#1 Requestor block 244 and the TU#2 Responder block 246 may each couple to the host bus interface 210 and the IB interface 212.

TU#1 244 may be the Requester TU. All requests sent by SIF 110 go through one of the TUs. SIF 110 may support the IB reliable communication protocol, whereby every request is properly acknowledged by the receiver before the request is completed at the sender. SIF 110 may support multiple command registers for applications to deposit commands—each command register typically dedicated to a host process. As the deposited commands are kicked off with doorbells, the commands may merge into a stream of commands that then feeds into the TU scheduler which schedules them onto available threads/command-slots on the thread engine. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed.

TU#2 246 may be the Responder TU. All incoming requests may be directed to the Responder TU (TU#2) 246 which processes the packet, ultimately delivering the packet to off-chip or on-chip memory or to other logic for processing collectives.

Figure 4:
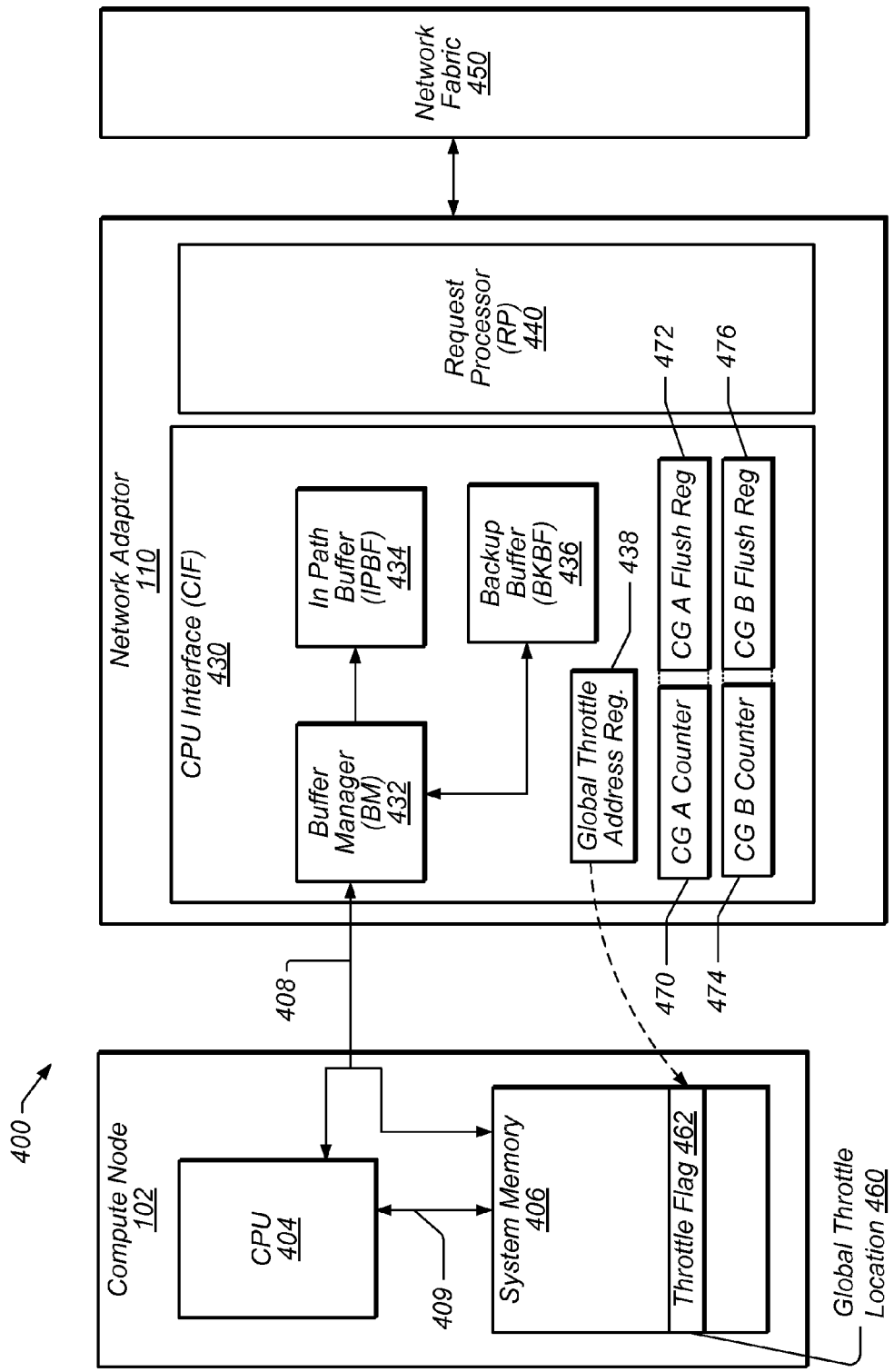
FIG. 4 is a block diagram of a system that comprises an embodiment of the invention.

FIG. 4 is a block diagram of a system that includes an embodiment of the invention. The system 400 comprises a compute node 102 connected by a local communications bus 408 to a network adapter (NA) 110. The compute node 102 comprises a CPU 404 and system memory 406. The local communications bus 408 allows the CPU 404 to communicate with the NA 110 and also allows the NA 110 to access system memory 406. The CPU 404 can also access system memory 406 via bus 409. The NA 110 may be comprised of two blocks—a CPU interface block (CIF) 430 and a Request Processor (RP) 440. The CIF 430 connects to the local communications bus 408 and thus allows the compute node 102 to communicate with the NA 110. The RP 440 converts requests received via the local communications bus 408 into remote requests that are transmitted onto a network fabric 450.

The CIF 430 may comprise an In-Path Buffer (IPBF) 434 that may form part of a request pipeline within the NA 110. Requests that are sent from the compute node 102 to the NA 110 on the local communications bus 408 are stored in the IPBF 434 en route to the RP 440. In addition to the IPBF 434, the CIF 430 further comprises a Backup Buffer (BKBF) 436 that may be utilized when the IPBF 434 has little or no available space. In one embodiment, the IPBF 434 and the BKBF 436 may both have 256 entries, where each entry may accommodate 64 bits of data and 16 bits of header. Note that the IPBF 434 and the BKBF 436 may be portions of the same memory element (e.g. RAM). The portions may be managed as two independent memories and there may be little or no physical partitioning. Alternative embodiments may have different buffer dimensions for the IPBF 434 and the BKBF 436. It may be advantageous for the BKBF 436 to have sufficient storage capacity to hold all requests that may be in the pipeline between the CPU 404 and the network adapter 110.

The CIF further may include an in-progress counter for a first (designated "A") completion group (CG Counter A) 470 and associated flush register (CG A Flush Register) 472. The CIF also includes an in-progress counter for a second (designated "B") completion group (CG Counter B) 474 and associated flush register (CG B Flush Register) 476. Other embodiments may have more such linked counters and flush registers, depending on the number of completion groups needing simultaneous support.

The NA 110 may comprise a Global Throttle Address Register (GTAR) 438 that may form part of the CIF 430. The GTAR 438 points to an address in system memory known as the Global Throttle Location (GTL) 460. The data held at the GTL 460 may be referred to as the Global Throttle Flag (GTF) 462. If the GTL 460 holds data equal to zero, then the GTF 462 is considered to be "cleared". If the GTL 460 holds non-zero data, then the GTF 462 is considered to be "set". Writing data to the GTL 460 may either set or clear the GTF 462, depending on the value of written data.

The NA 110 further includes a buffer manager BM 432 that is responsible managing the buffering of remote requests, including the transferring of incoming requests to the IPBF 434 and to the BKBF 436.

Software threads (or applications) running on the compute node 102 may read the GTF 462 prior to sending a network request. When the GTF 462 is placed in a cleared state, the software thread may be directed to issue a remote (network) request to the network adapter 110. When the GTF 462 is set, the software thread should not issue a remote request to the network adapter 110. When the GTF 462 is set, the software thread may spin in a loop and poll the GTL 460 until the GTF 462 is cleared. The software thread (or application) may wait on the GTF 462 being set using mechanisms provided by the operating system to yield and regain control. If the GTL 460 is cached in the CPU's L1 cache, polling the GTL 460 may take little time and introduce little latency (e.g., on the order of 10 CPU cycles or so).

Operational Description—Message Initiation

The system may be initialized with the throttle flag 462 cleared, which indicates that a software thread running on compute node 102 may issue remote requests to the NA 110. In "normal" operation, the NA 110 uses the IPBF 434 to hold pending remote requests. When remote requests cannot be immediately processed (e.g. because of network congestion) the growing number of outstanding requests issued by the CPU 404 on communications bus 408 generally has a constraining effect on the issuance of further requests by the CPU 404. When the holdup in processing remote requests is temporary, the NA 110 may simply wait for the transient problem to dissipate (e.g. for the network congestion to clear) and the pending requests to get processed. As the pending requests are processed, more requests may be accepted by the NA 110. The NA 110 may function in this situation without the use of the BKBF 436.

When the remote request processing problem is not a transitory problem and remote requests from the CPU 404 are stalled for an extended period, the NA 110 may set the GTF 462. For example, the GTF 462 may be set by the NA 110 when the number of entries in the IPBF 434 has exceeded a threshold (e.g., the IPBF 34 is full) and there is no network activity for some length of time (the wait time has exceeded a threshold). The length of time may be adjustable and size of the IPBF 434 depends on the embodiment. As an example, the NA 110 may wait for three hundreds microseconds before setting the GTF 462 and the IPBF 434 may hold 256 entries.

Setting the GTF 462 serves to direct software running on the compute node 102 to stop issuing remote requests. After the GTF 462 is set, the BM 432 accepts incoming requests from the CPU 404 and moves them into the BKBF 436 (assuming the BKBF 436 is not full). In a preferred embodiment, the BKBF 436 is large enough to hold all the remote requests (sent by compliant processes) that were received by the NA 110 after the IPBF 434 became full. These requests may include remote requests that were issued before the GTF 462 was set, remote requests that are sitting in buffers at the CPU's interface to the communications bus 408, and remote requests within CPU 404 store buffers and in CPU 404 pipeline stages. Once all the issued remote requests are moved into the BKBF 436, the CPU 404 pipelines will be clear, and hardware (or software) timeouts may be avoided.

When a non-compliant (e.g. buggy or malicious) application ignores the GTF 462 being set (and the application continues to issue remote requests) the NA 110 discards remote requests when the BKBF 436 is full. The discarding of requests is justified, since the application that is causing the overflow is not following the GTF convention as intended by the system designer. Consequently, the non-compliant application loses packets without impacting other applications on the system. The GTF 462 may be cleared once pending requests are processed and all the requests held in the backup buffer have been serviced.

Multiple CPUs

The embodiment in FIG. 4 shows a compute node with one CPU 404 and the description of FIG. 4 refers to an application or software thread. However, embodiments of the invention may support multiple applications simultaneously utilizing the NA 110. Also, in some embodiments, the NA 110 may be coupled to multiple CPUs—either directly or indirectly. In such embodiments, remote requests sent from the different CPUs to one NA 110 may be merged into one request stream that is sent to the RP 440 through the IPBF 434. In a preferred embodiment supporting multiple CPUs, the BKBF 436 is of sufficient size to the hold all the remote requests, from all the CPUs, that arrive at the NA 110 after the IPBF 434 is full, and that are generated before the GTF 462 has been set.

For example, in a system where a single CPU issues remote requests to a single network adapter, the backup buffer may hold 256 entries. However, in a similar system, where two CPU issue remote requests to a single network adapter, the backup buffer may hold 512 entries.

Multiple Virtual Channels

In the embodiments previously described, there was only one channel both in the CIF 430 and in the network fabric 450. However, network fabrics such as Infiniband support multiple virtual channels, where congestion in one virtual channel does not imply congestion in other virtual channels. Alternative embodiments of the invention may reflect and utilize this network capability so that remote requests to a congested virtual channel may be "throttled" while requests to non-congested virtual channels are not. This may be achieved by assigning an individual GTL 460 and an associated individual GTF 462 to each virtual channel. In addition, software threads that issue remote requests may be configured to check the appropriate GTF 462 for the virtual channel being used. Furthermore, a limitation may be placed on the number of entries that each virtual channel may have in the IPBF 434. Once that limit is reached, the NA 110 may stop accepting further remote requests for that virtual channel. When congestion does not resolve for a specific period, the network adapter may set the GTF 462 corresponding to the virtual channel and move outstanding requests for the channel into the backup buffer designated for the channel. Requests to other channels continue to be processed normally.

Control Flow—Message Initiation

Figure 5:
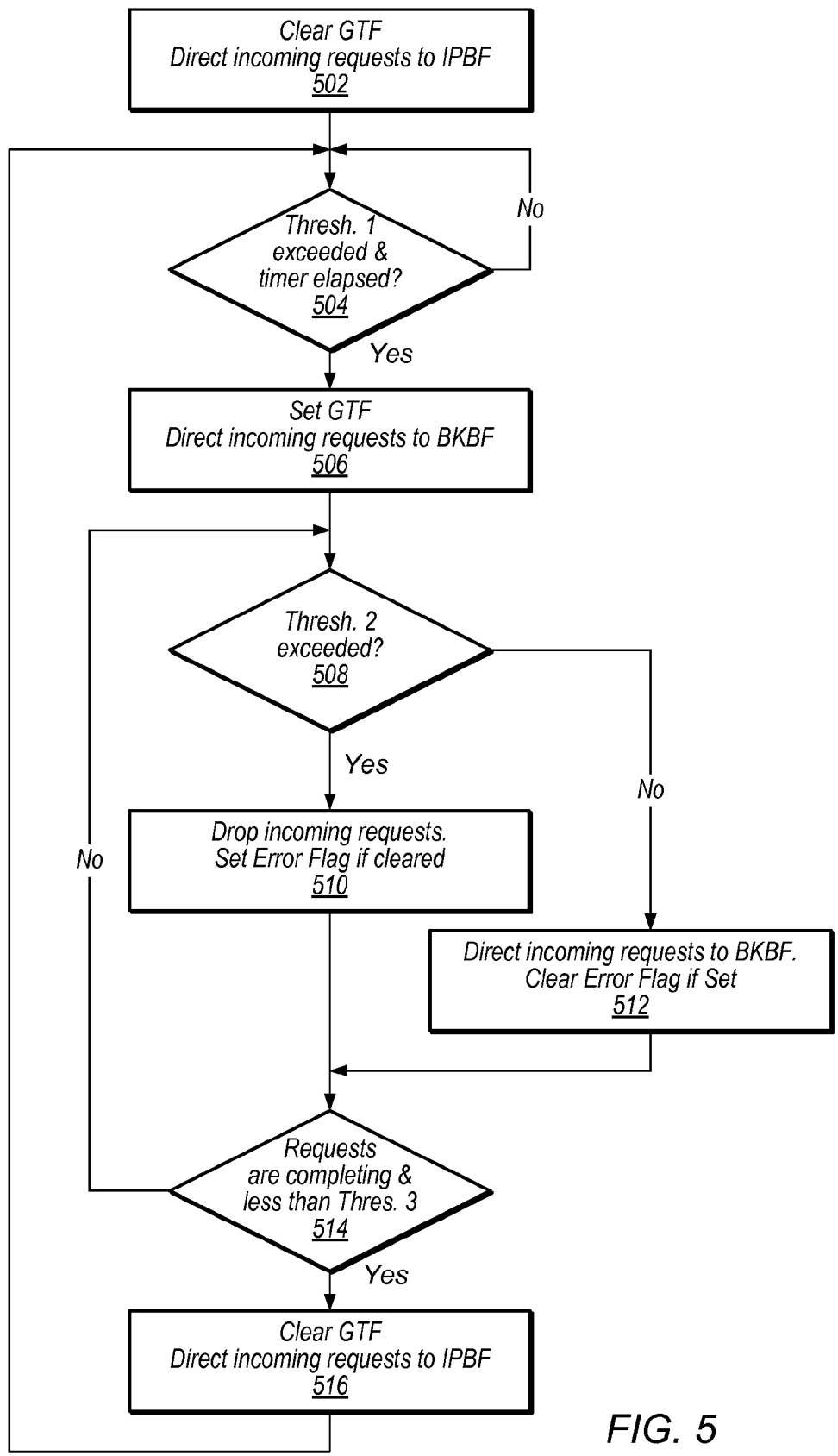
FIG. 5 is a flow chart illustrating the behavior of a network adapter according to one embodiment of the system.
Figure 6:
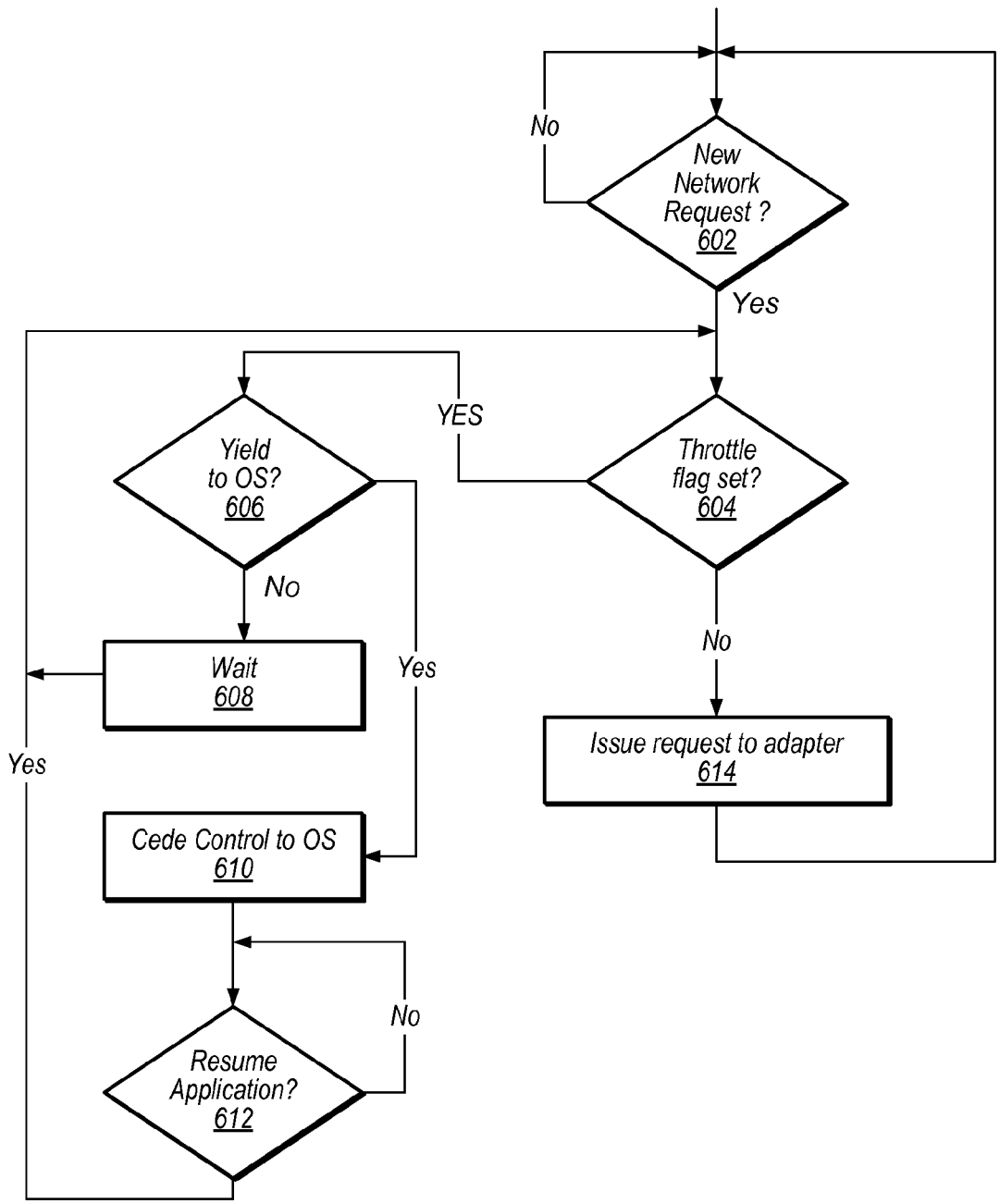
FIG. 6 is a flow chart illustrating the behavior of a well behaved application according to one embodiment of the system.

FIG. 5 and FIG. 6 together describe an exemplary embodiment of the invention with respect to improved message initiation. Another aspect of the invention (improved notification of request completion) is described separately in FIG. 7 and FIG. 8. FIG. 5 illustrates the control flow from the perspective of a network adapter 110 receiving message requests whereas FIG. 6 illustrates the control flow from the perspective of compute node software.

The flow shown in FIG. 5 commences in 502 with the clearing of the GTF 462 and the directing of future incoming message requests to the IPBF 434. Step 502 may be performed as part of the initiation of the NA 110. This configuration is maintained, in 504, until a threshold number (Thresh. 1) of requests in the IPBF 434 is reached (e.g. the IPBF 434 is full) and a timer, responsible for measuring the duration between the transmission of messages (by the NA 110), elapses. When the threshold is reached and the timer elapses, flow proceeds to 506, where the GTF 462 is set and future incoming requests are directed to the BKBF 436.

The flow then enters a loop that checks in 508 to see if a threshold number (Thresh. 2) of requests held in the BKBF 436 is exceeded (e.g. the BKBF is full) and checks in 514 to see if NA issued requests are completing and the BKBF holds less than a threshold number (Thresh. 3) of requests (e.g. the BKBF is empty).

If in 508 it is determined that the number of requests held in BKBF 436 does exceed Thresh. 2, future requests are dropped and an associated error flag is set (if not set already) in 510. Thus an error state may be entered when the backup buffer BKBF 436 is over a threshold (e.g., filled up) and subsequent requests will be discarded. In one embodiment, well behaved software may include comprehensive cleanup/execution handling logic, e.g., where the exception handling takes into account that requests may not have been recorded by the NA 110.

From 510, flow continues to 514 and the checking loop of 514, 508. Alternatively, if in 508, it is determined that the number of requests held in BKBF 436 does not exceed Thresh. 2 (i.e., there is still capacity for additional requests in BKBF 436), future requests are directed, in 512, to the BKBF 436 and the associated error flag is cleared (if set).

The checking loop in 508 and 514 may be exited from 514, when requests are completing and there are fewer than Thresh. 3 requests in the BKBF 436. These conditions indicate that network requests are being processed normally and the number of requests in the BKBF 436 are low, or perhaps equal to zero. In this case, the GTF 462 can be cleared and future incoming requests directed to the IPBF 434, as in 516. From 516, flow return to the 504, where the number of entries in the IPBF 434 is monitored.

FIG. 6 shows a flow chart illustrating operation of exemplary compute node software (e.g. an application and OS) that supports improved message initiation. Decision block 602 represents the software performing tasks other than generating network requests. When there is a new network request, flow proceeds to 604 where the software determines if the throttle flag (GTF 462) is set or not. If the flag is not set (i.e. cleared) then the software can simply issue the request to the NA 110, as in 614. If the GTF 462 is set, then well behaved software does not issue a new network request. In 606 if it is decided not to cede control to the OS, the application waits (in some other fashion) 608, and then, after waiting, checks to see if the throttle flag is set 604. If in 606 it is decided to yield control to the OS, flow proceeds to 610 where control is ceded to the OS. The flow then proceeds to 612 where the application software essentially waits for the OS to return control. When the OS returns control (i.e. tells the application to proceed), the flow returns again to 604, with a check on the GTF 462 status.

Completion of Issued Requests

As previously discussed in the description of related art, traditional methods of tracking the completion of requests sent to a network adapter incur significant overhead. Reducing this overhead would benefit the efficiency of networked systems. A reduction in the overhead involved in tracking network request completions may be achieved in the following manner.

An application organizes requests (send and receive) into groups, and associates each request group with a "completion group". A completion group (CG) is a logical entity that defines the granularity of completion tracking. All outstanding requests to a completion group are, from an application's perspective, completed together. A request group could be very large (perhaps containing hundreds or thousands of requests).

Send and receive requests may be initiated through accesses to doorbells. A doorbell is a write issued by software running on a CPU to an address mapped to a device (such as a network adapter) which causes the device to perform some action (such as sending a packet over the network fabric). Thus a doorbell is analogous to a house doorbell in the sense that it tells the device that some new action is needed. To support fast completions, doorbells may be partitioned into multiple groups—as many as there are completion groups. Typically, each partition will have a full complement of the doorbells—so if N doorbells are needed, and if there are P completion groups, the number of implemented doorbells will be N*P. Note that a doorbell does not represent a significant hardware resource, and adding doorbells has minimal impact on chip area.

Each completion group may have an associated in-progress counter which keeps count of all outstanding requests issued to doorbells in the partition associated with the completion group. As requests are completed, the counter is decremented. The in-progress counter keeps count of all outstanding requests issued to doorbells in the partition associated with the completion group. As requests are completed, the counter is decremented.

When an application wishes to complete a group it may issue a "flush" operation to the "flush register" associated with the in-progress counter of the completion group. The flush register may be set when a flush operation reaches the network adapter. The flush register may be reset by a reset-flush operation whose sole function is to reset the flush counter. The flush and reset-flush operations may be ordered in the path from the CPU to the network adapter.

Flush operations, when directed towards the network adapter from the CPU, may force all outstanding requests in the path from the CPU to the network adapter. The implementation of the flush operation may depend on the host bus that connects the CPU to the network adapter. For example, a posted write operation may be a good flush operation when the request doorbells are also posted write operations. Posted write operations are typically ordered by host buses from a source to a destination, and so the flush posted write will push other posted writes before it to the network adapter. In other cases a CPU barrier operation followed by a write may be a good flush operation.

After the CPU issues the flush operation, the CPU may then read the flush register and the in-progress counter for the CG as one operation. When the flush register is set, and the in-progress counter is zero then the associated requests have completed. The application may issue a reset-flush operation before reusing the same counter.

By completing requests in large groups, applications may reduce the overhead of the completion step—only one check may be needed to complete an entire group, instead of the per request completions that is traditionally employed. Also, by providing multiple groups, embodiments of the invention allow applications the flexibility to selectively complete different groups of requests. Further, application behavior tends to naturally align with group completions. Many applications for instance have a computation phase followed by a communication phase—it may be efficient in such cases to complete all the requests issued in one communication phase as one group.

One drawback of completing requests in groups as described above is the lack of specific knowledge when one or more requests in a group fail to complete. Since it is not known which request has failed, software cannot perform a retry for the failed request(s). One solution to this is to have the network adapter deposit completion records in a standard completion queue when requests are not completed successfully. So, when the application finds that a group of requests has not completed for a long period, it may go to the completion queue, and check if there is an error corresponding to one of the pending requests, and retry that request if needed.

The described mechanism is, in some respects, similar to a barrier function, and it may be used, for instance, to implement a barrier function for a set of RDMA operations. Here, the RDMA operations that will participate in the barrier are all included in the same group, and issued to the network adapter. When group completion is determined as described earlier, the barrier is completed.

Also, the described in-progress counters also provide a mechanism to perform flow control. Since, at any point in time, the in-progress counters have an accurate view of the number of outstanding operations, applications may use the counters to control the number of outstanding operations there are per completion group, and hence control buffer usage on the network adapter.

Improved Notification of Message Completion

Figure 7:
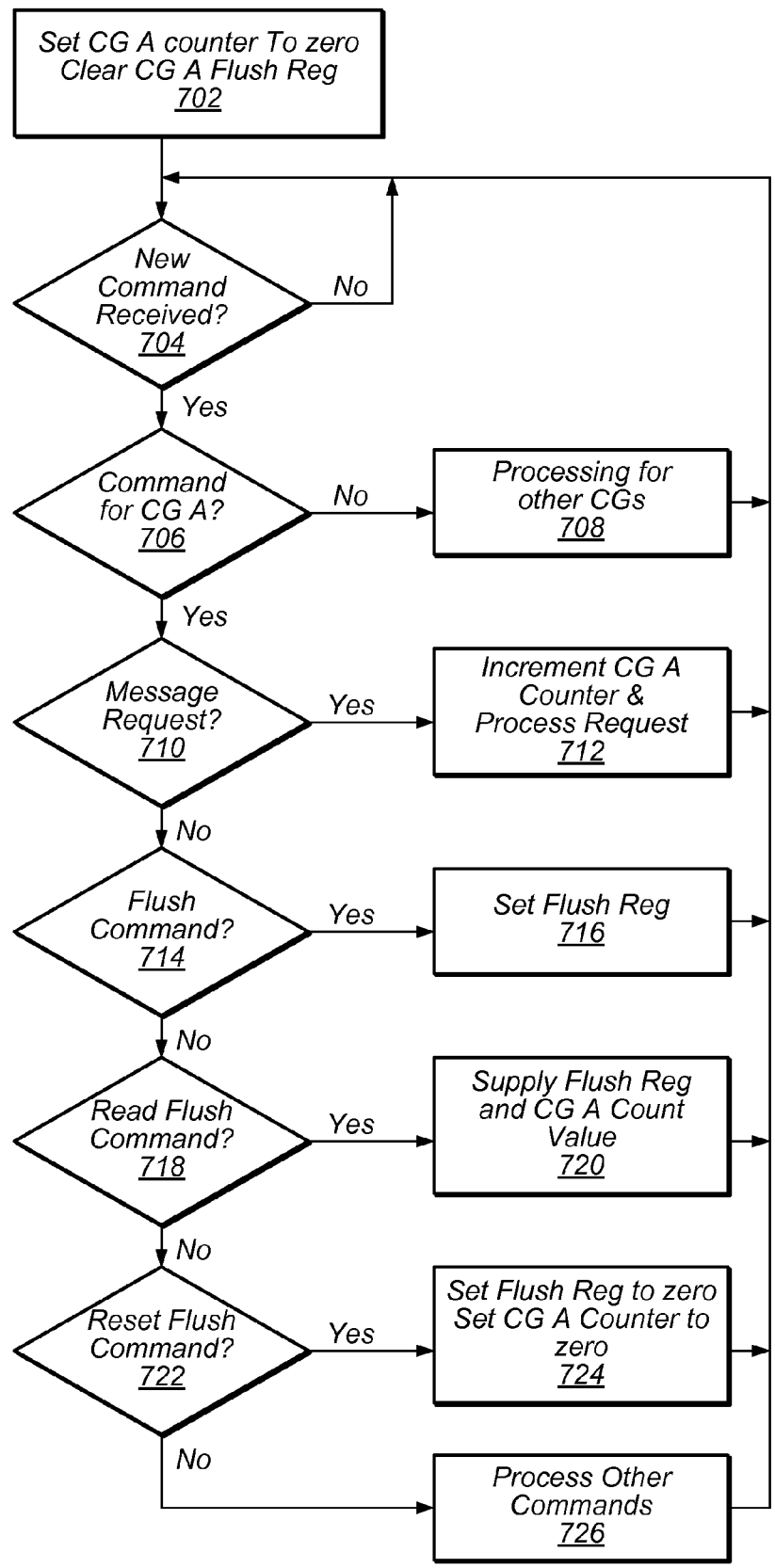
FIG. 7 is a flow chart illustrating the behavior of a network adapter according to one embodiment of the system.
Figure 8:
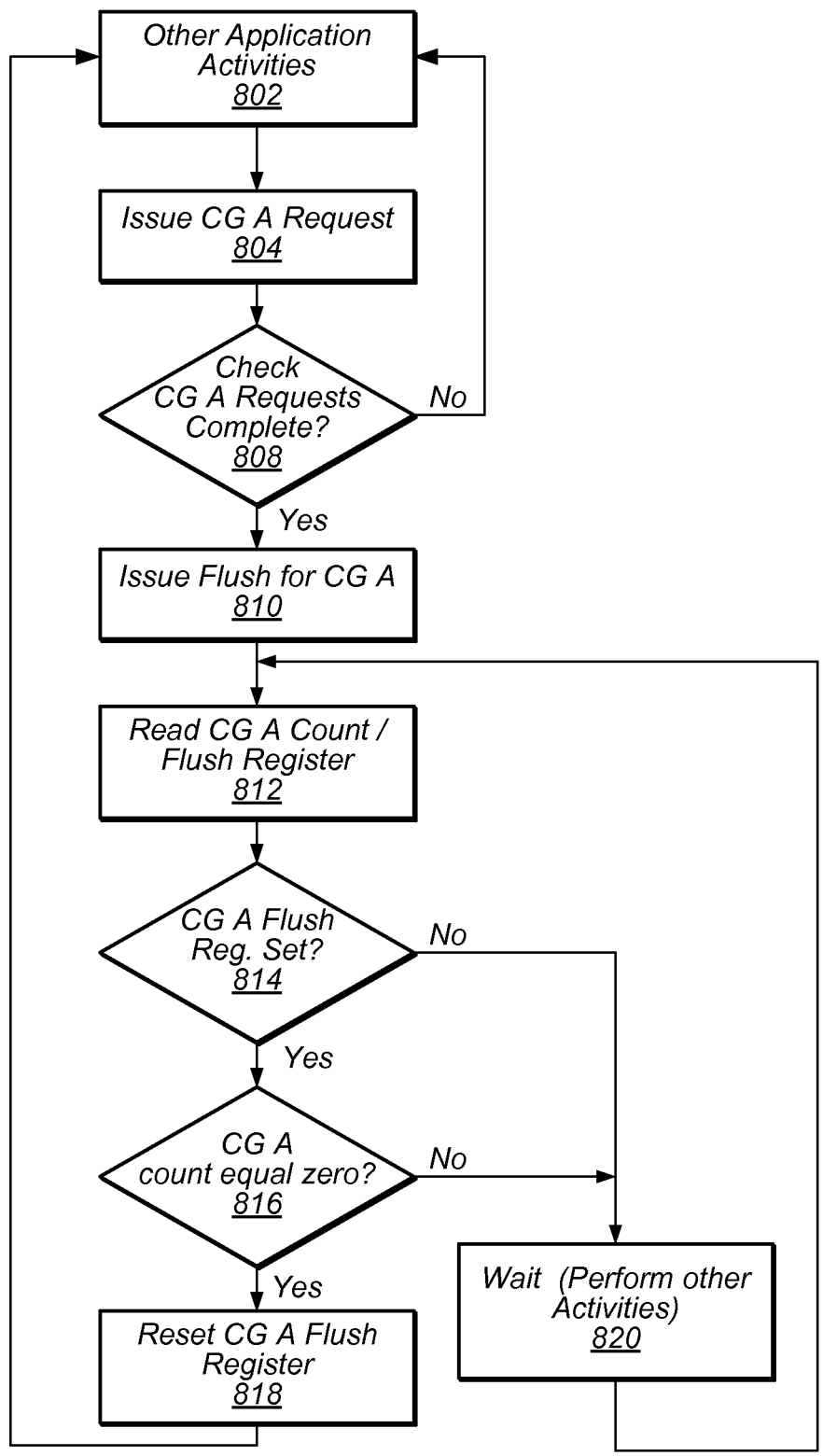
FIG. 8 is a flow chart illustrating the behavior of a well behaved application according to one embodiment of the system.

FIG. 7 and FIG. 8 show, from a NA perspective (FIG. 7) and host software perspective (FIG. 8), the processing flow associated with an embodiment of the invention as relates to improved notification of request completion. The number of completion groups supported by the NA (and host software), is dependent on the embodiment. Fortunately, the flow can be described in terms of one completion group, with the understanding that the processing flow for other completion groups is basically the same.

FIG. 7 illustrates the processing flow performed by an exemplary NA 110 for a single completion group (CG A). The flow starts in 702 (an initialization step) where the in-progress counter associated with completion group A "CG A Counter" 470 is set to zero. Also performed in 702, CG A Flush Register 472 is cleared. Then, in 704, the NA 110 awaits a new network request (command) to be received. When a command request is received, it is checked, in 706, to see if it is associated with CG A. If the command request is not associated with CG A, flow proceeds to 708 where the processing for other completion groups (and non-CG based requests) is performed. If it is a command for CG A, then the network adapter performs different actions based on the type of command; after each appropriate action is taken, flow returns to 704 where the adapter waits on the next command request.

In 710, it is determined if the received command request is a network message request. If so, then in 712 the CG A Counter 470 is incremented and the command is forwarded for processing. If, however, the command request is not a message request then flow proceeds to 714. In 714 it is determined if the command request is a flush request. If the command request is a flush request, then the CG A Flush Register 472 is set in 716. If the command request is not a flush request, then flow proceeds to 718. In 718 it is determined if the command request is a read flush request. If the command request is a read flush request, the NA 110 supplies (in 720) the status of the CG A Flush Register 472 and the current value of the CG A Counter 470. It may be advantageous to supply these two values in one operation since they can change independently. If the command request is not a read flush request, then flow proceeds to 722. In 722 it is determined if the command request is a reset flush request. If the command request is a reset flush request, the NA (in 724) clears the CG A Flush Register 472 and clears the CG A Counter 470. If it is not a reset flush request (or indeed any of the previously mentioned request types) then flow proceeds to 726, where other command types are processed. As mentioned above, after the command specific actions have been taken in 708, 712, 716, 720, 724 and 726, flow returns to 704 where the NA 110 waits on new command requests.

FIG. 8 illustrates the processing flow performed by an exemplary application (and associated privileged software) for a single completion group (CG A). While it is generally more beneficial to have multiple completion groups the flow for each completion group is basically the same and so, for purposes of clarity and ease of explanation, the flow for a single completion group is explained.

The flow starts in 802 with the application performing various activities that may include issuing network requests to other completion groups, or issuing non CG-based network requests. At some point, the application issues a network request to CG A, 804. Periodically, or perhaps after a specific number or a specific sequence of network requests have been issued to CG A, the application may wish to check the completion status of transfer requests associated with CG A. This conditional aspect of the flow is represented by decision step 808. If the application does not wish to check the completion status of CG A, flow proceeds to other activities 802.

If the application does wish to check the completion status of transfer requests associated with CG A, flow proceeds to 810. In 810, a Flush command for GC A is issued. This Flush command pushes any outstanding requests for CG A (that may be in CPU buffers or may be in-transit to the NA 110) into the NA 110. Any such CG A requests arriving at the NA 110 increment the CG A Counter 470. The Flush Command then sets the CG A Flush Register 472. Flow then proceeds to 812.

In 812, the application reads, in one operation, the CG A Counter 470 and coupled CG A Flush Register 472. The flow then proceeds to 814. In 814, if the CG A Flush Register 472 is not set, flow proceeds to 820. In 820 the application waits (and perhaps performs other tasks). The flow then proceeds to 812, where the application reads the CG A Counter 470 (and CG A Flush Register 472) again. If in 814 the flush bit is set, then flow proceeds to 816 where the application compares the CG A Counter 470 value (read in 812) to zero. If the read CG A Counter 470 value does equal zero, flow proceeds to 818. In 818 the application is informed that all outstanding network requests for this completion group have, in fact, completed. In this case, the CG A Counter 470 and associated CG A Flush Register 472 can be reset in preparation for reuse by the application. Flow then proceeds from 818 back to 802, with the application performing other activities.

If, in 816, the CG A Counter 470 does not equal zero, the application is informed that not all of the outstanding requests for CG A have completed. In this case, flow proceeds to 820, where the application waits on requests to complete and then back to 812 where the CG A Counter 470 and CG A Flush Register 472 are re-read.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for handling data transfer requests, the method comprising:
   receiving a first data transfer request, wherein the first data transfer request requests a data transfer over a network, wherein the first data transfer request is received by a network adaptor from a local compute node;
   placing information corresponding to the first data transfer request in a first buffer;
   determining that more transfer requests should not be issued based on transmission delays in the network, wherein said determining is performed after said receiving the first data transfer request and after said placing information corresponding to the first data transfer request in the first buffer;
   indicating to at least the local compute node that more transfer requests should not be issued in response to said determining that more transfer requests should not be issued;
   receiving a second data transfer request, wherein the second data transfer request requests a data transfer over the network, wherein the second data transfer request is received after said indicating; and
   placing information corresponding to the second data transfer request in a second buffer in response to the indication that more transfer requests should not be issued.

2. The method of claim 1, wherein said determining that more transfer requests should not be issued comprises:
   detecting a transaction delay on the network; and
   determining that the first buffer contains at least a specific number of entries.

3. The method of claim 1, further comprising:
   determining that the second buffer contains at least a specific number of entries;
   indicating that the second buffer contains at least the specific number of entries;
   receiving a third data transfer request after said indicating that the second buffer contains at least the specific number of entries;
   discarding the third data transfer request in response to the indication that the second buffer contains at least the specific number of entries.

4. The method of claim 1,
   wherein the first data transfer request comprises one of the following
   a load request to an address on the local compute node; or
   a store request to an address on the local compute node.

5. The method of claim 1,
   wherein said indicating comprises setting a flag in a memory of the local compute node;
   wherein the flag is accessible by the local compute node.

6. The method of claim 5,
   wherein when the local compute node desires to issue a third data transfer request to the network, the local compute node checks the flag;
   wherein the local compute node does not issue the third data transfer request to the network adaptor if the flag indicates that more transfer requests should not be issued.

7. The method of claim 1, further comprising:
- determining that more transfer requests should be issued, wherein said determining is performed after said indicating that more transfer requests should not be issued;
- indicating that more transfer requests should be issued in response to said determining that more transfer requests should be issued;
- receiving a third data transfer request, wherein the third data transfer request requests a data transfer over the network, wherein the third data transfer request is received after said indicating that more transfer requests should be issued; and
- placing information corresponding to the third data transfer request in the first buffer in response to the indication that more transfer requests should be issued.

8. The method of claim 7, wherein said determining that more transfer requests should be issued comprises:
- determining that transfer requests issued to the network are completing; and
- determining that the second buffer contains at most a specific number of entries.

9. A network adaptor for handling data transfer requests of a local compute node, wherein the network adaptor is coupled to the local compute node, the network adaptor comprising:
- a host interface for coupling to the local compute node, wherein the host interface is configured to receive a first data transfer request from the local compute node, wherein the first data transfer request requests a data transfer over a network;
- a network interface for coupling to the network;
- a buffer manager coupled to the host interface which is configured to:
  - place information corresponding to the first data transfer request in a first buffer;
  - determine that more transfer requests should not be issued based on transmission delays in the network, wherein said determining is performed after said receiving the first data transfer request and after said placing information corresponding to the first data transfer request in the first buffer;
  - indicate to the local compute node and the host interface that more transfer requests should not be issued in response to said determining that more transfer requests should not be issued;
- wherein when the host interface receives a second data transfer request that requests a data transfer over the network after the indication that more transfer requests should not be issued, the buffer manager is configured to place information corresponding to the second data transfer request in a second buffer in response to the indication that more transfer requests should not be issued.

10. The network adaptor of claim 9, wherein in determining that more transfer requests should not be issued, the network adaptor is configured to detect a transaction delay on the network and determine that the first buffer contains at least a specific number of entries.

11. The network adaptor of claim 9,
- wherein the buffer manager is further configured to:
  - determine that the second buffer contains at least a specific number of entries;
  - indicate that the second buffer contains at least the specific number of entries;
- wherein when the host interface receives a third data transfer request after the indication that the second buffer contains at least the specific number of entries, the network adaptor is configured to discard the third data transfer request in response to the indication that the second buffer contains at least the specific number of entries.

12. The network adaptor of claim 9,
- wherein the first data transfer request comprises one of the following
  - a load request to an address on the local compute node; or
  - a store request to an address on the local compute node.

13. The network adapter of claim 9,
- wherein, in indicating that more transfer requests should not be issued, the buffer manager is configured to set a flag in a memory of the local compute node;
- wherein the flag is accessible by the local compute node.

14. The network adaptor of claim 9,
- wherein after the indication that more transfer requests should not be issued the buffer manager is further configured to:
  - determine that more transfer requests should be issued;
  - indicate that more transfer requests should be issued;
- wherein when the host interface receives a third data transfer request that requests a data transfer over the network after the indication that more transfer requests should be issued, the buffer manager is configured to place information corresponding to the third data transfer request in the first buffer in response to the indication that more transfer requests should be issued.

15. The network adaptor of claim 14,
- wherein in determining that more transfer requests should be issued, the network adaptor is configured to:
- determine that transfer requests issued to the network are completing;
- determine that the second buffer contains at most a specific number of entries.

\* \* \* \* \*